(12) United States Patent
Gendotti et al.

(10) Patent No.: US 12,529,803 B2
(45) Date of Patent: Jan. 20, 2026

(54) METHOD FOR IDENTIFYING A MOVING RADIATION SOURCE

(71) Applicant: Arktis Radiation Detectors Ltd., Zürich (CH)

(72) Inventors: Ulisse Gendotti, Zürich (CH); Rico Chandrasekharan, Zürich (CH); Jan Nowakowski, Meilen (CH)

(73) Assignee: Arktis Radiation Detectors Ltd., Zürich (CH)

( * ) Notice: Subject to any disclaimer, the term of this patent is extended or adjusted under 35 U.S.C. 154(b) by 179 days.

(21) Appl. No.: 18/682,989

(22) PCT Filed: Aug. 9, 2022

(86) PCT No.: PCT/EP2022/072367
§ 371 (c)(1),
(2) Date: Feb. 12, 2024

(87) PCT Pub. No.: WO2023/017045
PCT Pub. Date: Feb. 16, 2023

(65) Prior Publication Data
US 2024/0361473 A1    Oct. 31, 2024

(30) Foreign Application Priority Data
Aug. 13, 2021    (CH) ................. 070164/2021

(51) Int. Cl.
*G01T 1/167*    (2006.01)
*G01T 7/12*    (2006.01)
(Continued)

(52) U.S. Cl.
CPC .............. *G01T 1/167* (2013.01); *G01T 7/12* (2013.01); *G01V 5/26* (2024.01); *G06N 3/08* (2013.01)

(58) Field of Classification Search
CPC .. G01T 1/167; G01T 7/12; G01V 5/26; G06N 3/08
See application file for complete search history.

(56) References Cited

U.S. PATENT DOCUMENTS 10,956,807 B1 *   3/2021   Abeloe ............... G06F 18/2413
2006/0284094 A1   12/2006   Inbar
2011/0215253 A1   9/2011   van Bree et al.

FOREIGN PATENT DOCUMENTS

WO    2014198537 A1   12/2014
WO    2020127842 A2    6/2020

OTHER PUBLICATIONS

Dadon, "Planning the Second Generation of Smart Cities: Technology to handle the pressures of urbanization", IEEE Electrification Magazine, 2019, vol. 7:3, pp. 6-15.
(Continued)

*Primary Examiner* — David P Porta
*Assistant Examiner* — Fani Polyzos Boosalis
(74) *Attorney, Agent, or Firm* — The Webb Law Firm

(57) ABSTRACT

A method for identifying a moving radiation source by a radiation portal monitoring system is described. The radiation portal monitoring system includes a radiation portal monitor with a plurality of radiation detectors configured to detect ionizing radiation of the radiation source and to generate a detection signal responsive to detection of the ionizing radiation, and at least one processor executing the steps of providing an identification machine learning model; receiving labelled static identification training data generated by radiation detection of a plurality of known static radiation sources; introducing to the static identification training data modifications representing detection signal alterations caused by radiation source movement through the radiation portal monitor to obtain pseudo-dynamic identification training data; training the identification machine
(Continued)

learning model using the pseudo-dynamic identification training data; and identifying the moving radiation source from the detection signal using the trained identification machine learning model.

33 Claims, 11 Drawing Sheets

(51) Int. Cl.
*G01V 5/26* (2024.01)
*G06N 3/08* (2023.01)

(56) References Cited

OTHER PUBLICATIONS

Kamuda et al., "Automated Isotope Identification Algorithm Using Artificial Neural Networks", IEEE Transactions on Nuclear Science, 2017, vol. 64:7, pp. 1858-1864.
Pilato et al., "Application of neural networks to quantitative spectrometry analysis", Nuclear Instruments & Methods in Physics Research: Section A, 1999, pp. 423-427.

* cited by examiner

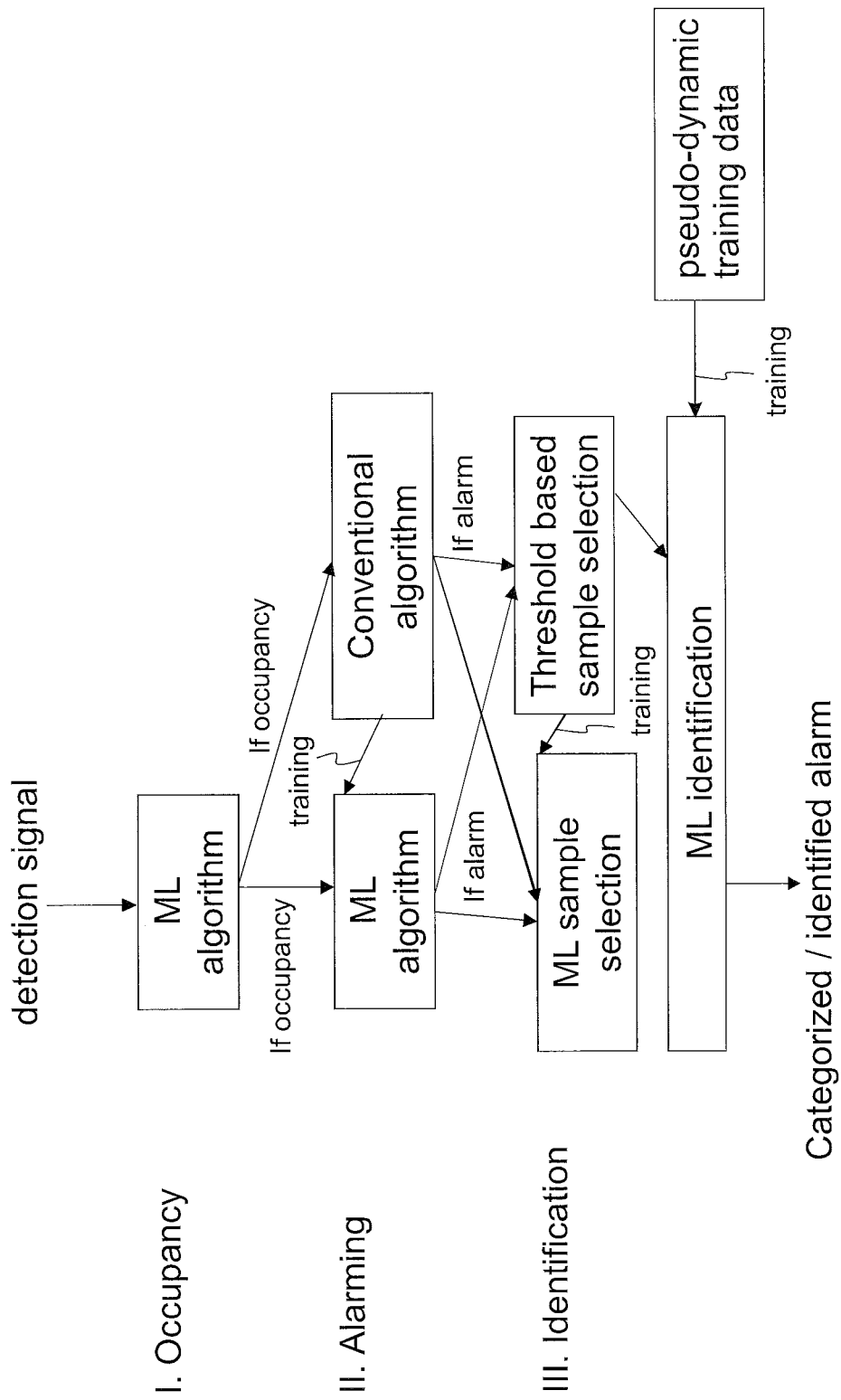

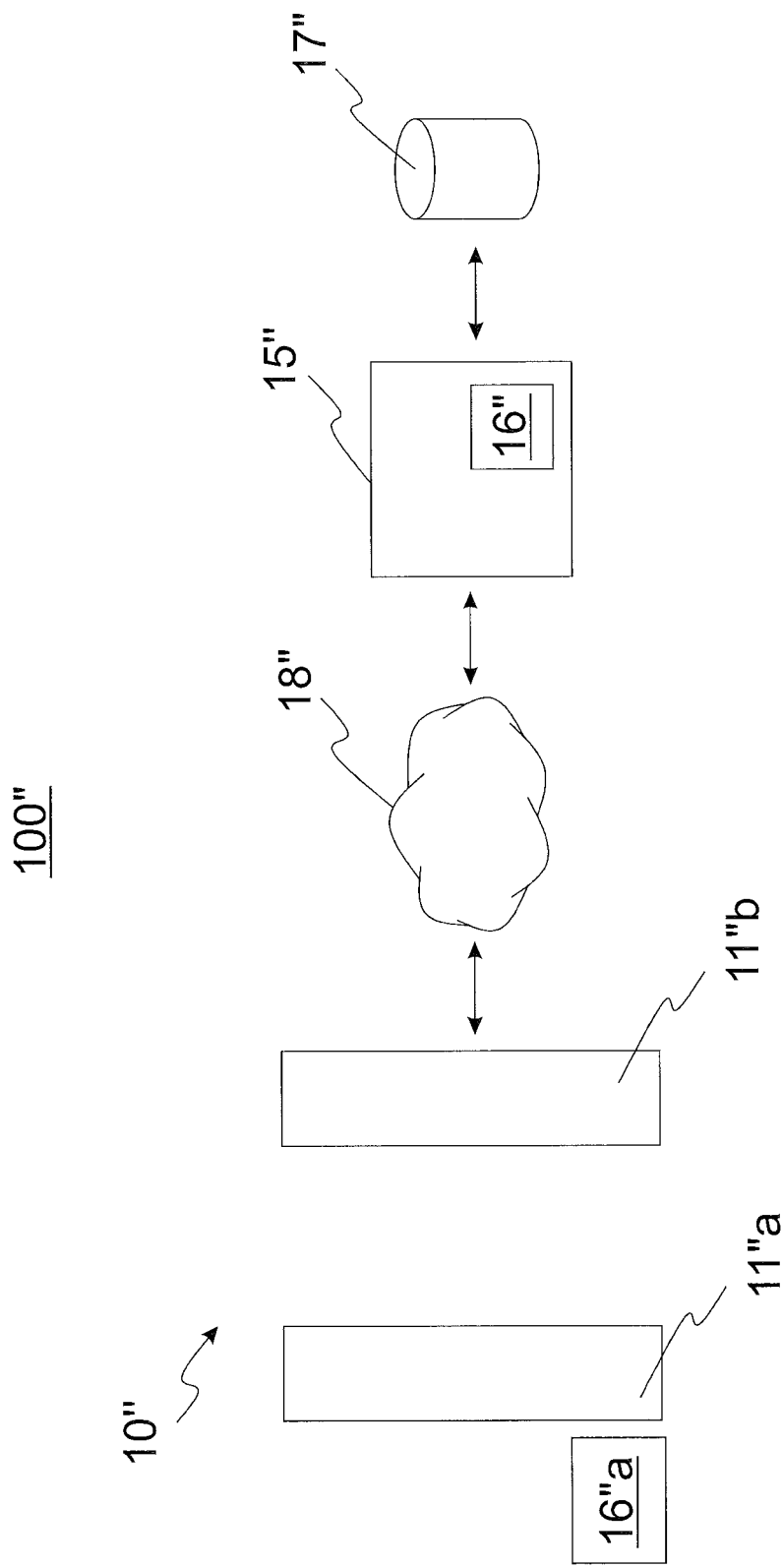

METHOD FOR IDENTIFYING A MOVING RADIATION SOURCE

CROSS-REFERENCE TO RELATED APPLICATIONS

This application is the United States national phase of International Application No. PCT/EP2022/072367 filed Aug. 9, 2022, and claims priority to Swiss Patent Application No. 070164/2021 filed Aug. 13, 2021, the disclosures of each of which are hereby incorporated by reference in their entireties.

BACKGROUND OF THE INVENTION

Field of the Invention

The present invention relates to a method for identifying a moving radiation source by a radiation portal monitoring system and to a radiation portal monitoring system for identifying a moving radiation source.

Description of Related Art

Radiation portal monitors (RPMs) deployed at various screening locations such as border checkpoints, seaports, airports, urban centers, in the vicinity of nuclear facilities, import/export terminals, etc., are used to screen objects such as containers, vehicles, persons, etc., passing through the RPM. The RPMs are configured to detect ionizing radiation in order to alert to the presence of illicit transports of radiological and nuclear materials. RPMs are capable to detect radiological threats such as shielded special nuclear materials (SNM). Further, the RPMs are required to discern SNM such as plutonium or highly enriched uranium from benign sources of radiation such as Naturally Occurring Radioactive Materials (NORM), medical isotopes, and natural backgrounds.

Besides activating an alarm based on specific count rate criteria, RPMs may identify the nature of the radiation source passing through the RPM by analyzing the spectrum of the detected radiation. In particular, the RPMs may identify the specific radioisotopes (e.g., Cs-137 and K-40) or the type of isotopes (NORM, medical, nuclear, industrial) most likely contained in the screened object. The radiation source may also for example be characterized by analyzing the time pattern of the detected radiation events with respect to time correlation structures. Such an example of a conventional method for detecting nuclear and/or radiological material using an RPM is described in WO2014/198537 A1.

Recently, artificial intelligence and machine learning have attracted great interest for applications such as image or pattern recognition, speech recognition or machine translation, and other classification or prediction tasks. The idea to apply concepts of machine learning in various fields have led to proposals to use machine learning for radionuclide identification.

Such a method is for example described in M. Kamuda, J. Stinnett, and C. J. Sullivan, IEEE Transactions on Nuclear Science, Vol. 64, No. 7, 1858-1864 July 2017. It is proposed to perform radioisotope identification and quantification based on NaI gamma-ray spectra using an artificial neural network, which is trained to calculate the relative activities of 32 radioisotopes in a spectrum. The artificial neural network is trained with simulated gamma-ray spectra from a library of the 32 radioisotopes.

V. Pilato, F. Tola, J. M. Martinez, M. Huver, Nucl. Instr. and Meth. in Phys. Res. A 422 (1999) 423-427 propose to use a neural network composed of two layers of neurons to determine the activity of radionuclides contained in a solution in a fixed measurement configuration. The measurement setup comprises a coaxial HPGe detector and a radioactive solution with a mixture of $^{139}$Ce, $^{141}$Ce, $^{57}$Co, $^{58}$Co, $^{131}$I, $^{85}$Sr and $^{88}$Y. A training set is designed from mixtures of said radionuclides and $^{137}$Cs. For each of the eight products, the spectra for variable counting times simulating variable activities are established from a sample of known activity. The training set is the result of the combination of the spectra obtained, simulating mixtures from one to eight products. The training is carried out on a perceptron with eight entries and eight outputs.

Before deploying a machine learning model on a classification task, the machine learning model has to be trained by using appropriate training data in order to obtain a trained machine learning model able to generalize and classify in an accurate fashion. Specifically, the training data should sufficiently reflect realistic data the machine learning model is to be deployed on and be provided in a manner to avoid issues such as overfitting or underfitting.

While machine learning has been shown to provide accurate results for radionuclide identification in stationary radiation detection settings, RPM systems involve issues such as moving radiation sources, plurality of different shielding configurations, background radiation, etc., which make the analysis of radiation detection signals acquired by an RPM system challenging.

SUMMARY OF THE INVENTION

It is therefore an object of the invention to provide a method for identifying a moving radiation source by a radiation portal monitoring system and to provide a radiation portal monitoring system for detecting and identifying a moving radiation source which at least partially improve the prior art and avoid at least part of the disadvantages of the prior art.

According to the present invention, this object is achieved by the features and advantageous embodiments disclosed herein.

According to an aspect of the invention, the object is particularly achieved by a method for identifying a moving radiation source by a radiation portal monitoring system, the radiation portal monitoring system comprising a radiation portal monitor comprising a plurality of radiation detectors configured to detect ionizing radiation of the moving radiation source and to generate a detection signal responsive to detection of the ionizing radiation, and at least one processor, the method comprising the at least one processor executing the steps of: providing an identification machine learning model; receiving labelled static identification training data generated by radiation detection of a plurality of known static radiation sources; introducing to the static identification training data modifications representing detection signal alterations caused by radiation source movement through the radiation portal monitor to obtain pseudo-dynamic identification training data; training the identification machine learning model using the pseudo-dynamic identification training data; and identifying the moving radiation source from the detection signal using the trained identification machine learning model.

In the context of the present invention, the skilled person shall understand that the term "identification" or "identify" may comprise both identifying the specific material or material composition of the moving radiation source, such as the one or more isotopes contained therein, and/or identifying the category of the moving radiation source such as nuclear, medical, industrial, NORM etc. Identifying the moving radiation source from its detection signal using the trained identification machine learning model may therefore comprise the machine learning model performing an isotope classification and/or a category classification of the radiation source detected.

As mentioned above, the non-stationary nature of a radiation source moving through an RPM together with varying conditions such as shielding and/or background radiation increases the complexity in detection signal analysis compared to stationary radiation detection settings. Likewise, the question arises how a machine learning model is to be trained in order to be able to accurately classify radiation sources through passing the RPM, and specifically, which training dataset is to be provided to adequately reflect the real scenario of radiation detection and identification in an RPM.

In this respect, the present invention provides the advantage that labelled static identification training data generated by radiation detection of known static radiation sources can be used as a resource for obtaining pseudo-dynamic identification training data for training the identification machine learning model to be used to identify a radiation source moving through the RPM. Large amounts of static identification training data can more easily and cost-effectively be generated compared to dynamic training data gathered from measurements of traffic or radiation sources, respectively, passing through the RPM.

Static identification training data may for example be generated by a plurality of measurements per isotope at several distances between the isotopes and the radiation detectors and provided to the at least one processor. The radiation detectors used for generating the static identification data may or may not be part of the RPM in question.

The measurements may be performed by exposing individual radiation detectors, arrays of radiation and/or full detectors RPM configurations to one or more of: naturally occurring radiation background, stationary radioactive sources, shielded radioactive sources. Typical radiation sources used for generating static identification training data may include: Am-241, Co-57, Co-60, Ba-133, Cs-137, medical isotopes, NORM such as bulk fertilizer, rock salt, cat litter etc.

Further, laboratory measurements may be used to generate static identification training data of SNM such as U-235, Highly Enriched Uranium, Pu-239 or reactor Pu.

The labelled static identification training data set obtained by such measurements may then be conditioned by introducing various modifications representing detection signal alterations due to radiation source movement through the RPM, such as for example under-sampling, energy peak broadening, temporal broadening, parallax, collimation, addition of random noise, simulation of background variations etc.

Static identification training data may also be generated by (Monte Carlo) simulated data for isotopes that are not readily available in the laboratory.

Static identification training data may also be generated by accessing a database with known spectra.

Compared to detection signals in a stationary setting, the detection signals of moving radiation sources, such as by traffic passing through the RPM, are altered owing to the dynamic nature of the radiation source moving through the RPM. Introducing modifications which represent such detection signal alterations allows to condition the static identification training data to obtain pseudo-dynamic training identification data which adequately reflect the real scenario of RPM radiation detection. Using the pseudo-dynamic identification training data obtained by modifying static identification training data, the identification machine learning model can sufficiently be trained to be deployed in a dynamic situation to identify a moving radiation source passing through the RPM.

The method may be executed by a processor located at the RPM and/or by a processor of a remote computer. In some embodiments, the method may be executed by a plurality of processors. For example, one or more processors of, e.g., one or more remote computers may execute one or more of: providing the identification machine learning model, receiving the labelled static identification training data, conditioning the static identification training data and/or training the identification machine learning model, whereas one or more processors located at the RPM may execute the identifying of the moving radiation source using the trained identification machine learning model. Other allocations of the method steps for a plurality of processors at different locations may be possible. In particular, training the identification machine learning model may be executed by a separate processor.

The at least one processor may therefore include one or more processors, e.g., of a remote computer, executing the training of the identification machine learning model and one or more processors, e.g., of the RPM or located at the RPM, respectively, executing the identifying of the moving radiation source, wherein the one or more processors executing the training may provide the trained identification machine learning model to the one or more processors executing the identifying of the moving radiation source.

The plurality of processors may communicate with each other via a communication network, such as for example the internet. The at least one processor may communicate with the RPM and/or components of the RPM via a communication network, such as for example the internet. The communication network may include wired and/or wireless sections. The at least one processor may be part of a control system. The control system may be a remote computer system, for example a cloud-based computer system.

After training of the identification machine learning model by a dedicated processor, said processor may provide the trained identification machine learning model to another processor of the RPM system, e.g., a processor located at the RPM, which uses the trained identification machine learning model to identify the moving radiation source. The processor used for training of the identification machine learning model may provide the trained identification machine learning model to the another processor of the RPM system, e.g., a processor located at the RPM, by way of an RPM software update. In particular, the processor of the RPM system used for identifying the moving radiation source may receive a periodic software update with improved trained identification machine learning models being trained on further sets of pseudo-dynamic identification training data. In some embodiments, some of the processors of the plurality of processors may be part of a cloud-based computer system.

The radiation detectors of the RPM may comprise one or more neutron detectors and/or gamma detectors. The detection signal of the one or more radiation detectors of the RPM may comprise one or more of: time stamped count rate evolutions of the gamma detectors, count rate evolutions in specific energy windows of interest of the gamma detectors, for example in an energy window characteristic of the response to 186 keV gamma rays from U-235, detection signals of temporally coincident triggering gamma detectors, spectral evolution data, background-corrected response spectra sampled at a specific sampling rate from a count rate trace of the gamma detector for a detection signal showing an anomaly in the count rate evolution, in the count rate ratio relative to another gamma detector and/or in the temporal coincidence with other gamma detectors. The detection signal of the one or more radiation detectors of the RPM may further comprise one or more of: count rate evolutions of the neutron detectors, count rate ratios between detectors showing comparable count rates, and/or temporally coincident triggering neutron detector segments.

The modifications introduced to the static identification training data represent detection signal alterations caused by radiation source movement through the RPM and may specifically and/or additionally be caused by, e.g., one or more of: alteration of response spectrum of the detection signal due to different relative positions of the radiation detectors, broadening of peak structures in response spectrum of the detection signal due to shielding of the radiation source by a container containing the radiation source, alteration of the response spectrum due to variation of angle of incidence of the ionizing radiation, changes in the detection signal background due to traffic passing through the radiation portal monitor and at least partially shielding background radiation, shifting of spectra of the radiation source to higher or lower energies due to imperfect radiation detector calibration, response spectrum alteration due to varying speed of the radiation source movement, response spectrum alteration due to detector under-performance, and/or response spectrum alteration due to statistical nature of the radiation detection.

In some embodiments, identifying the moving radiation source from the detection signal using the trained identification machine learning model comprises a threshold-based sample selection step, the threshold-based sample selection step comprising the at least one processor executing the steps of: sampling a count rate trace of the detection signal of one or more radiation detectors of the radiation portal monitoring system at a sampling rate R; selecting response spectrum samples of the sampled count rate trace with count rates above a count rate threshold; and providing the selected response spectrum samples as an input to the trained identification machine learning model.

The detection signals of the one or more radiation detectors of the RPM typically comprise response spectra of radiation events detected with a certain count rate. By selecting response spectrum samples of the sampled count rate trace with count rates above the count rate threshold, the signal-to-noise ratio of the input data for the trained identification machine learning model can be improved, as only response spectrum samples with a sufficient detection signal strength are selected and response spectrum samples with weak signal strength are discarded, which improves the accuracy of radiation source identification by the trained identification machine learning model.

The threshold-based sample selection step is particularly advantageous for taking into account the dynamic setting of RPM radiation detection, as the strength of the detection signal of a radiation detector of the RPM typically varies depending on the distance of the radiation source moving through the RPM to the radiation detector, where the signal strength decreases with increasing distance of the radiation source to the detector. With the threshold-based sample selection step, it can be ensured that only data of response spectra of radiation events detected in sufficiently close proximity to the respective radiation detector is used as input to the trained identification machine learning model.

In some embodiments, the at least one processor may set the count rate threshold as lying n times the fluctuations $\sigma$ of a count rate background above a local minimum of the count rate trace, wherein n being preferably between 2 and 4, particularly preferably n=3.

In some embodiments, the threshold-based sample selection step comprises the at least one processor executing an energy selection step by selecting samples within one or more predetermined energy windows of interest.

For example, such an energy window of interest may be around the radiation detector's response to the 186 keV gamma rays emitted by U-235.

Optionally, a sample selection machine learning model may be provided, which may be trained by RPM detection signal data together with output data of the threshold-based sample selection step used as sample selection training data. The training of the sample selection machine learning model may be executed by one or more dedicated processors.

In some embodiments, identifying the moving radiation source from the detection signal using the trained identification machine learning model comprises the at least one processor executing a detector selection step by selecting a detection signal of one or more radiation detectors of the radiation portal monitoring system with the largest count rate increase relative to the background count rate as input to the trained identification machine learning model.

By executing the detector selection step, the signal-to-noise ratio of the input data to the trained identification machine learning model can be increased, such that the accuracy of radiation source identification by the trained identification machine learning model can be improved. The detector selection step therefore advantageously allows to select and group detection signal data with the largest or sufficiently significant anomalies in count rate and/or response spectrum to an alarm group of detection signal data with a higher signal-to-noise ratio than the aggregate detection signal data of all radiation detectors. Further, detection signals from radiation detectors with a low count rate increase for which the identification accuracy of the trained identification machine learning model would be insufficient due to a low signal-to-noise ratio of the input data, can be discarded.

By selecting the detection signal of only a subset of the radiation detectors of the RPM, the signal to noise ratio of the neural network input can be improved, which improves the precision of the identification by the trained identification machine learning model.

Further, by selecting the detection signal of only a subset of the radiation detectors of the RPM, the amount of data to be processed by the trained identification machine learning model can be reduced, which makes the identification by the trained identification machine learning model more efficient.

Preferably, the background count rate is measured prior to occupancy of the radiation portal monitor. The number of radiation detectors selected by the at least one processor at the detector selection step may depend on the amount of the count rate increase of the radiation detector with the largest count rate increase. Specifically, the at least one processor may be configured to select fewer radiation detectors (or detection signals of fewer radiation detectors, respectively) in case of large count rate increases in the detection signals of a limited number of detectors relative to the background count rate. For example, the processor may be configured to select the detection signals of all radiation detectors with count rates exceeding the background by a factor of at least 5 if the detection signal of the radiation detector with the largest count rate increase exhibits a count rate increase of a factor of at least 10 with respect to the background. For smaller count rate increases of the radiation detector with the largest count rate increase, the processor may be configured to apply a less strict selection criterion. For example, the processor may be configured to select all radiation detectors with count rates exceeding the background by factor of at least 1.2 if the detection signal of the radiation detector with the largest count rate increase exhibits a count rate increase of a factor of at least 1.5 with respect to the background.

In some embodiments, the at least one processor executes the detector selection step by selecting the detection signal of a predetermined or fixed set of radiation detectors of the RPM. For example, the at least one processor may select the detection signal of all radiation detectors of the RPM arranged at the left-hand side of the lanes of the RPM (in the direction of passage through the RPM), to form a left pillar alarm group of detection signal data. Similarly, the at least one processor may select the detection signal of the radiation detectors arranged at the right-hand side of the lanes of the RPM to form a right pillar alarm group of detection signal data.

In some embodiments, the at least one processor may select the detection signal of a particular group of radiation detectors depending on a specific isotope targeted for detection by the RPM. The RPM may for example comprise different kinds of radiation detectors with different sensitivities for radiation emitted by different isotopes. The RPM may for example comprise radiation detectors comprising plastic scintillator slabs, e.g. made of PVT, PET or polystyrene, particularly suitable to detect low energy gamma radiation. Further, the RPM may comprise radiation detectors particularly suitable to detect higher energy gamma, or other forms of radiation. Depending on the radiation source to be expected to pass through the RPM or to be targeted for detection by the RPM, the at least one processor may select the detection signal of the radiation detectors suited for detection of low energy gamma radiation or the detection signal of the radiation detectors suited for higher energy gamma or other forms of radiation, to form a respective alarm group.

In some embodiments, the at least one processor executes the detector selection step by selecting the detection signals of a plurality of possible radiation detector combinations and uses the detection signals of each detector combination thereof as an input for the trained identification machine learning model. After applying the trained identification machine learning model to the selected detection signals, the at least one processor may discard the detector combinations with insufficient identification accuracy. In some embodiments, the at least one processor executes the detector selection step by selecting the detection signals of all possible radiation detector combinations.

In some embodiments, the at least one processor executes the threshold-based sample selection step after executing the detector selection step. The threshold-based sample selection step may thus be executed on the count rate traces of the detection signals of the selected radiation detectors (or of the alarm group, respectively).

Alternatively, the at least one processor may execute the detector selection step after executing the threshold-based sample selection step. From the response spectrum samples selected in the threshold-based sample selection step, the response spectrum samples of the radiation detectors with the largest count rate increases relative to the background count rate may thus be selected.

In some embodiments, the at least one processor shifts the detection signals of at least a portion of the group of radiation detectors in time, when the at least one processor selects detection signals of a group of radiation detectors in the detector selection step.

By shifting the detection signals of at least a portion of the group of radiation detectors in time, time delays of radiation detection between the radiation detectors of the selected group resulting from motion of the radiation source through the radiation portal monitor can be compensated. Preferably, the shifts in time therefore equal the time delay of radiation detection between the respective radiation detectors.

Preferably, the identification machine learning model comprises an artificial neural network. Preferably, the artificial neural network includes a convolutional neural network.

In some embodiments, the method further comprises the at least one processor executing the steps of: providing an alarming machine learning model, the alarming machine learning model preferably comprising an artificial neural network; receiving alarming training data labelled as potential threat source worthy of further analysis or as benign source not worthy of further analysis; training the alarming machine learning model using the alarming training data; and classifying the moving radiation source from its detection signal using the trained alarming machine learning model as potential threat source or benign source; in case of the moving radiation source being classified as potential threat source, identifying the moving radiation source from its detection signal using the trained identification machine learning model.

The RPM system may therefore comprise the at least one processor using two separate machine learning models for different purposes: the identification machine learning model for identifying the radiation source, and the alarming machine learning model for classifying the radiation source as potential threat or benign and thus worthy or not worthy for further analyzing using the identification machine learning model. As described further below, the RPM system may in some embodiments comprise the at least one processor using additionally a third machine learning model for determining occupancy of the RPM.

By using the trained alarming machine learning model, it can be ensured that only the detection signal of moving radiation sources which have been classified as potential threat sources are passed on to the trained identification machine learning model for identification of the radiation source, such that processing efficiency can be increased. Advantageously, scanned vehicles whose radiation signature are deemed to be benign, either by the trained alarming or the trained identification machine learning model, do not need to be stopped for further inspection while operating of the RPM.

Preferably, the alarming training data is generated by one or more of: count rate evolution data, count rate evolution data within one or more predetermined energy windows of interest, spectral evolution data, and/or ancillary data of the radiation portal monitor, labelled using secondary inspection data, possibly in addition to data derived from a database.

The count rate evolution data and/or the spectral evolution data may be generated by the detection signals of the one or more of gamma detectors and/or neutron detectors of the RPM. Preferably, the alarm training data is therefore generated by RPM detection signals. The secondary inspection data is typically labelled using secondary inspection carried out to verify whether traffic that has triggered an alarm of a potential threat in fact does contain a radiological threat.

Secondary inspection may be carried out by routing the traffic which has triggered an alarm through another RPM, preferably at a lower speed, through another RPM with higher resolution radiation detectors dedicated for secondary inspection. Secondary inspection may also be carried out by a person, such as a customs officer, using a handheld radioisotope identifier to localize and identify the source, and inspecting the shipping documents.

In particular, secondary inspection may provide labels as potential threat source or as benign source as illustrated in the following exemplary scenarios:

- A vehicle is not carrying radioactive material but has triggered a false alarm due to the vehicle accidentally shielding background radiation as a function of time in a fashion that passing of a radioactive material is mimicked;
- A vehicle is carrying NORM, such as a bulk fertilizer, which has correctly/incorrectly been classified by the RPM using a conventional alarming algorithm and has correctly/incorrectly been declared in a shipping manifest;
- A vehicle is carrying a shielded nuclear warhead which has correctly been detected based on its neutron emission while the gamma detectors have registered only an insignificant increase in count rate;
- A vehicle is recognizable by ancillary sensors as being a model particular prone to affecting background radiation levels in an unusual manner, for example due to a large trailer gap, which a conventional 1 alarming algorithm is likely to ascribe to a threat source being present; and/or
- A vehicle is recognizable by ancillary sensors working in conjunction with a database as having previously been associated with criminal persons or activities, therefore meriting unusually high scrutiny.

In some embodiments, the alarming training data is generated by one or more of: ancillary data obtained from ancillary sensors (e.g., optical or wireless vehicle or device identification systems) possibly in conjunction with a database, count rate evolution data, count rate evolution data within one or more predetermined energy windows of interest, and/or spectral evolution data of the radiation portal monitor, conditioned by introducing modifications representing predetermined anomalies of response spectra of the detection signal caused by presence of threat sources with different shielding configurations.

The modifications representing anomalies of response spectra may be introduced by the at least one processor of the RPM system or another processor. By conditioning the RPM detection signals such as count rate evolution data or spectral evolution data, used for generating the alarming training data, augmentation of the training dataset can be achieved. In particular, by introducing modifications representing predetermined or known (or synthetic) anomalies caused by the presence of threat sources with specific shielding configurations, correct labels can be assigned to the respective RPM detection signal dataset. For example, conditioning of the RPM detection signals advantageously allows to also use RPM detection signals which might not have been classified correctly as potential threat source by a conventional alarming algorithm, as the RPM detection signals can be labelled correctly according to the modifications, representing anomalies in the form of radiation signatures of threat sources with different shielding configurations, introduced to the RPM signal dataset.

In some embodiments, the alarming training data is generated by one or more of count rate evolution data, count rate evolution data within one or more predetermined energy windows of interest, and/or spectral evolution data, of another radiation portal monitor, labelled using secondary inspection data, wherein the count rate or spectral evolution data is conditioned by introducing modifications representing differences in detector configuration with respect to the other radiation portal monitor.

By using RPM detection signals of another RPM, the set of alarming training data can further be augmented. By introducing modifications representing differences in detector configuration with respect to the other RPM, the accuracy of the trained alarming machine learning model can be improved when the trained alarming machine learning model is deployed at the RPM in question. Modifications representing differences in detector configuration may for example include different time delays of detection signals between different radiation detectors due to different arrangements of the radiation detectors in the RPM in question and the other RPM. Using another or multiple installed RPMs with similar geometries as the RPM in question for gathering alarming training data (and/or occupancy training data, as described further below) provides the advantage that difficulties of gathering alarming training data and/or occupancy training data from the RPM in question during operation can be circumvented.

In some embodiments, the method further comprises the at least one processor executing a conventional alarming algorithm using a dynamic threshold on an alarming function of one or more of: count rate evolution data, count rate evolution data within one or more windows of interest, and/or spectral predetermined energy evolution data of the radiation portal monitor, wherein the at least one processor classifies the moving radiation source as potential threat source if the alarming function exceeds the dynamic threshold.

Advantageously, the dynamic threshold may be adapted to the characteristics of the RPM detection signal that includes, e.g., the count rate evolution data and spectral evolution data. For example, the dynamic threshold may be changed depending on the count rate evolution of a radiation source passing through the RPM. If the at least one processor classifies a moving radiation source as potential threat source, an alarm may be triggered.

In some embodiments, the dynamic threshold is increased by the at least one processor when a response spectrum of the detection signal detected during occupancy is comparable or similar to a response spectrum measured from natural background prior to occupancy, and being decreased when the count rate during occupancy falls below the background count rate.

In doing so, the dynamic threshold can be adapted if it is set at a too low or too high value, in order to find an optimal value of the dynamic threshold for reliably providing an alarm for potential threat sources.

In some embodiments, the at least one processor classifies the moving radiation source from the detection signal as potential threat source or benign source using the conventional alarming algorithm prior to and/or while training the alarming machine learning model.

Similar to as described above, training the alarming machine learning model may preferably be executed by one or more dedicated processors different from one or more processors classifying the moving radiation source from the detection signal as potential threat or benign source using the conventional alarming algorithm. The one or more processors dedicated for training the alarming machine learning model may provide the trained alarming machine learning model or improved trained alarming machine learning models to the one or more processors classifying the moving radiation source by way of one or more (periodic) RPM software updates. The at least one processor may therefore include one or more processors, e.g., of a remote computer, executing the training of the alarming machine learning model and one or more processors, e.g., of the RPM or located at the RPM, respectively, executing the classifying of the moving radiation source as potential threat or benign source, wherein the one or more processors executing the training may provide the trained alarming machine learning model to the one or more processors executing the classifying of the moving radiation source.

Using the conventional alarming algorithm provides the advantage that false alarms due to an insufficiently trained alarming machine learning model can be reduced, which is typically the case prior to training or in an early stage of training of the alarming machine learning model.

In some embodiments, the at least one processor uses the detection signal of the radiation portal monitor together with output data of the conventional alarming algorithm as alarming training data to train the alarming machine learning model.

Using the conventional alarming algorithm provides the advantage that besides determining whether a scanned radiation source is a threat or benign, the output data of the conventional alarming algorithm that includes the information on the classification whether the scanned radiation source is a threat or benign can additionally be used for labelling the RPM detection signal of the scanned radiation source to obtain labelled alarming training data.

In some embodiments, while training the alarming machine learning model, the method comprises the at least one processor determining and comparing the accuracies of the classification of the moving radiation source from the detection signal as potential threat source or benign source using the conventional alarming algorithm and using the alarming machine learning model, and terminating the using of the conventional alarming algorithm if the accuracy of the classification using the alarming machine learning model exceeds the accuracy of the classification using the conventional alarming algorithm.

The at least one processor may compare the accuracies of the classification using the conventional alarming algorithm and using the alarming machine learning model after each periodic RPM software update where improved trained alarming machine learning models are provided from the one or more processors executing the training to the one or more processors executing the classifying.

With the conventional alarming algorithm, a flexible twofold alarming process can be established which is especially advantageous at an early stage of deployment of the alarming machine learning model where the alarming machine learning model is not yet sufficiently trained to deliver accurate classification results. The progress in performance of the alarming machine learning model can be monitored by the at least one processor by comparing the accuracy of classification by the conventional alarming algorithm and the alarming machine learning model when both are used in parallel to classify radiation sources passing through the RPM. As soon as the accuracy of the alarming machine learning model is sufficient in that its performance exceeds the performance of the conventional alarming algorithm, the RPM system can rely on the alarming machine learning model for the alarming process.

In some embodiments, the method further comprises the at least one processor executing the steps of: providing an occupancy machine learning model, the occupancy machine learning model preferably comprising an artificial neural network; receiving occupancy training data labelled by true occupancy or false occupancy; training the occupancy machine learning model using the occupancy training data; and classifying a detection signal as being associated with true occupancy or with false occupancy using the trained occupancy machine learning model; in case of a detection signal being classified as being associated with true occupancy, identifying a moving radiation source from the detection signal using the trained identification machine learning model.

The RPM system may therefore comprise the at least one processor using two separate machine learning models for different purposes: the identification machine learning model for identifying the radiation source, and the occupancy machine learning model for classifying a detection signal as being linked with true occupancy or with false occupancy. In case the at least one processor uses the alarming machine learning model to classify the radiation source as potential threat or benign, the RPM system may comprise the at least one processor using three separate machine learning models for different purposes: the identification machine learning model for identifying the radiation source, the alarming machine learning model to classify the radiation source as potential threat or benign, and the occupancy machine learning model for classifying a detection signal as being originating from true occupancy, i.e., from traffic passing through the RPM or having another origin without traffic passing through the RPM, i.e. being detected in spite of false occupancy.

Occupancy sensing provides the advantage that false alarms can be reduced, as alarms occurring at false occupancy, such as without traffic passing through the RPM, can usually be classified as false alarms. After training the occupancy machine learning model until a satisfactory accuracy in occupancy classification, preferably exceeding the accuracy of conventional occupancy sensing, is reached, conventional occupancy sensing can be set aside as the occupancy can reliably be classified using the trained occupancy machine learning model.

Similar to as described above, training the occupancy machine learning model may preferably be executed by one or more dedicated processors different from one or more processors classifying the occupancy. The one or more processors dedicated for training the occupancy machine learning model may provide the trained occupancy machine learning model or improved trained occupancy machine learning models to the one or more processors classifying the occupancy by way of one or more (periodic) RPM software updates.

The occupancy training data may be generated by one or more of: count rate evolution data, count rate evolution data within one or more predetermined energy of interest, or spectral evolution data of the radiation portal monitor or another radiation portal monitor.

In particular, the occupancy training data may be generated by the detection signals of one or more of the gamma detectors and/or neutron detectors of the RPM or another RPM. Preferably, the occupancy training data is therefore generated by RPM detection signals.

Preferably, the at least one processor uses the detection signal of the radiation portal monitor together with occupancy data of conventional occupancy sensors, such as light barriers, LIDARs, cameras and/or occupancy data from time delayed detection signals of an array of radiation detectors arranged along a direction of passage through the radiation portal monitor as occupancy training data.

Occupancy data of conventional occupancy sensors and/or occupancy data inferred from time delayed detection signals of an array of radiation detectors arranged along a direction of passage through the RPM may therefore be used for labelling the RPM detection signals to obtain labelled occupancy training data. The time delayed detection signals of the array of radiation detectors can be used for occupancy sensing, as the time delay typically depends on the velocity of the vehicle moving through the RPM.

Using occupancy data from the time delayed detection signals of the array of radiation detectors for labelling the occupancy training data provides the advantage that defectiveness of occupancy data from conventional occupancy sensing can be avoided, as the generation of occupancy data does not have to rely on conventional occupancy sensing. Occupancy data from conventional occupancy sensing may exhibit defects associated with malfunctioning of the occupancy sensors due to for example animals, irradiations, misalignment of the occupancy sensors or solar optical illusions. Camera based occupancy sensing may for example suffer from insufficient lighting conditions.

Alternatively or additionally, the at least one processor may use occupancy sensing data of another radiation portal monitor, conditioned by introducing modifications representing differences in detector configuration with respect to the other radiation portal monitor, as occupancy training data.

The occupancy sensing data may include detection signal data and associated occupancy classification data. By using occupancy sensing data of another RPM, the set of occupancy training data can be augmented. By introducing modifications representing differences in detector configuration with respect to the other RPM, the accuracy of the trained occupancy machine learning model can be improved when the trained occupancy machine learning model is deployed at the RPM in question. Modifications representing differences in detector configuration may for example include different time delays of detection signals between different radiation detectors due to different arrangements of the radiation detectors in the RPM in question and the other RPM.

In some embodiments, the method comprises the at least one processor training the alarm machine learning model for occupancy classification using one or more of: count rate evolution data, count rate evolution data within one or more predetermined energy windows of interest, and/or spectral evolution data of the radiation portal monitor or another radiation portal monitor, labelled by true or false occupancy, as occupancy training data for the alarm machine learning model.

It is therefore also possible to train the alarming machine learning model such that the at least one processor may execute both occupancy classification and alarming classification by using the alarming machine learning model. The occupancy classification and alarming classification tasks may therefore be executed by a common machine learning model wherein the output of the common machine learning model includes an occupancy probability and an alarming probability (or threat probability, respectively).

Preferably, the identification machine learning model and/or the alarming machine learning model and/or the occupancy machine learning model is validated using a validation dataset of detection signals labelled by using secondary inspection data.

The secondary inspection data may be generated from inspection with one or more high resolution detectors, such as NaI (Tl) or HPGe, visual inspection, ancillary data such as cargo manifest, intelligence data, license plate, shipper information, origin and/or destination information, and/or wireless communication signatures emitted by the conveyance.

Alternatively or additionally, the identification machine learning model and/or the alarming machine learning model and/or the occupancy machine learning model may be validated using a validation dataset labelled by using the output of a conventional identification algorithm and/or a conventional alarming algorithm and/or conventional occupancy sensing.

The validation may be executed by the at least one processor of the RPM system. The validation may be executed by one or more processors located at the RPM and/or by one or more dedicated processors of one or more remote computers.

Preferably, training of the occupancy machine learning model, the alarming machine learning model, the identification machine learning model and the sample selection machine learning model may be executed by the same one or more dedicated processors.

According to a further aspect, the present invention is also directed to a radiation portal monitoring system for detecting and identifying a moving radiation source, comprising a radiation portal monitor with a plurality of radiation detectors configured to detect ionizing radiation of the radiation source and to generate a detection signal responsive to detection of the ionizing radiation, and at least one processor configured to: provide an identification machine learning model, preferably comprising an artificial neural network; receive labelled static identification training data generated by a plurality of measurements of static radiation sources; introducing to the static identification training data modifications representing detection signal alterations caused by radiation source movement through the radiation portal monitor to obtain pseudo-dynamic identification training data; train the identification machine learning model using the pseudo-dynamic identification training data; and identify the moving radiation source from the detection signal using the trained identification machine learning model.

In some embodiments, the at least one processor is further configured to: sample a count rate trace of the detection signal of a radiation detector of the radiation portal monitoring system at a sampling rate R; select response spectrum samples of the sampled count rate trace with count rates above a count rate threshold; and provide the selected response spectrum samples as an input to the trained identification machine learning model.

In some embodiments, the at least one processor is configured to set the count rate threshold as lying n times the fluctuations σ of a count rate background above a local minimum of the count rate trace, wherein n being preferably between 2 and 4, particularly preferably n=3.

In some embodiments, the radiation portal monitor comprises one or more panel radiation detectors comprising a plurality of adjoining plastic scintillator slabs, a plurality of silicon photomultiplier sensors arranged at an edge of at least one of the plastic scintillator slabs and configured to detect scintillation light generated in the scintillator slabs responsive to the radiation events, a plurality of signal processing units each connected to one of the silicon photomultiplier sensors, and a joint analyzing circuit configured to perform signal analysis to determine the energy of the detected radiation events. The response spectrum from such a detector may be a time-over-threshold spectrum.

In particular, the radiation portal monitor may include one or more panel radiation detectors as described in WO 2020/208203 A1, the disclosure of which is incorporated herein by reference.

According to a further aspect, the present invention is also directed to a computer program product comprising computer program code for identifying a radiation source moving through a radiation portal monitor of a radiation portal monitoring system, the radiation portal monitor comprising a plurality of radiation detectors configured to detect ionizing radiation of the radiation source and to generate a detection signal responsive to detection of the ionizing radiation, the computer program code configured to control at least one processor of the radiation portal monitoring system such that the at least one processor executes the steps of: providing an identification machine learning model; receiving labelled static identification training data generated by a plurality of measurements of static radiation sources; introducing to the static identification training data modifications representing detection signal alterations caused by radiation source movement through the radiation portal monitor to obtain pseudo-dynamic identification training data; training the identification machine learning model using the pseudo-dynamic identification training data; and identifying the moving radiation source from the detection signal using the trained identification machine learning model.

According to a further aspect, the present invention is also directed to a non-transitory computer-readable medium having stored thereon the computer program product as described in the present disclosure.

According to a further aspect, the present invention is also directed to a method for identifying a moving radiation source by a radiation portal monitoring system, the radiation portal monitoring system comprising a radiation portal monitor with a plurality of radiation detectors configured to detect ionizing radiation of the radiation source and to generate a detection signal responsive to detection of the ionizing radiation, and at least one processor, the method comprising the at least one processor executing the steps of: providing an identification machine learning model; and identifying the moving radiation source from the detection signal using the identification machine learning model, wherein the identification machine learning model is trained using pseudo-dynamic identification training data, wherein the pseudo-dynamic identification training is data obtained by introducing to labelled static identification training data modifications representing detection signal alterations caused by radiation source movement through the radiation portal monitor, wherein the labelled static identification training data is generated by radiation detection of a plurality of known static radiation sources.

According to a further aspect, the present invention is also directed to a method for generating pseudo-dynamic identification training data for an identification machine learning model configured to identify a moving radiation source from a detection signal of a radiation portal monitoring system, the radiation portal monitoring system comprising a radiation portal monitor with a plurality of radiation detectors configured to detect ionizing radiation of the moving radiation source and to generate a detection signal responsive to detection of the ionizing radiation, the method comprising the steps of: generating static identification training data radiation detection of a from plurality of known static radiation and generating pseudo-dynamic identification training data by introducing to the static identification training data modifications representing detection signal alterations caused by radiation source movement through the radiation portal monitor.

According to a further aspect, the present invention is also directed to a method of training an identification machine learning model to obtain a trained identification machine learning model configured to identify a moving radiation source from a detection signal of a radiation portal monitoring system, the radiation portal monitoring system comprising a radiation portal monitor with a plurality of radiation detectors configured to detect ionizing radiation of the moving radiation source and to generate a detection signal responsive to detection of the ionizing radiation, the method comprising at least one processor executing the steps of: providing the identification machine learning model; receiving labelled static identification training data generated by radiation detection of a plurality of known static radiation sources; introducing to the static identification training data modifications representing detection signal alterations caused by radiation source movement through the radiation portal monitor to obtain pseudo-dynamic identification training data; and training the identification machine learning model using the pseudo-dynamic identification training data; storing the trained identification machine learning model.

According to a further aspect, the present invention is also directed to a computer-implemented identification machine learning model trained according to the method of training an identification machine learning model as described in the present disclosure.

According to a further aspect, the present invention is also directed to a non-transitory computer-readable medium having stored thereon an identification machine learning model as described in the present disclosure.

BRIEF DESCRIPTION OF THE DRAWINGS

The terms FIG., FIGS., Figure, and Figures are used interchangeably in the specification to refer to the corresponding figures in the drawings.

The present invention will be explained in more detail, by way of exemplary embodiments, with reference to the schematic drawings, in which:

FIG. 3b shows a block diagram of an exemplary block unit of the identification machine learning model of FIG. 3a;

FIG. 5b shows a flow diagram of an exemplary sequence of steps of an embodiment of a method of identifying a moving radiation source using a trained occupancy machine learning model and at an early stage of training an alarming machine learning model;

FIG. 6 shows an illustration of an embodiment of an RPM system.

DETAILED DESCRIPTION

Figure 1A:
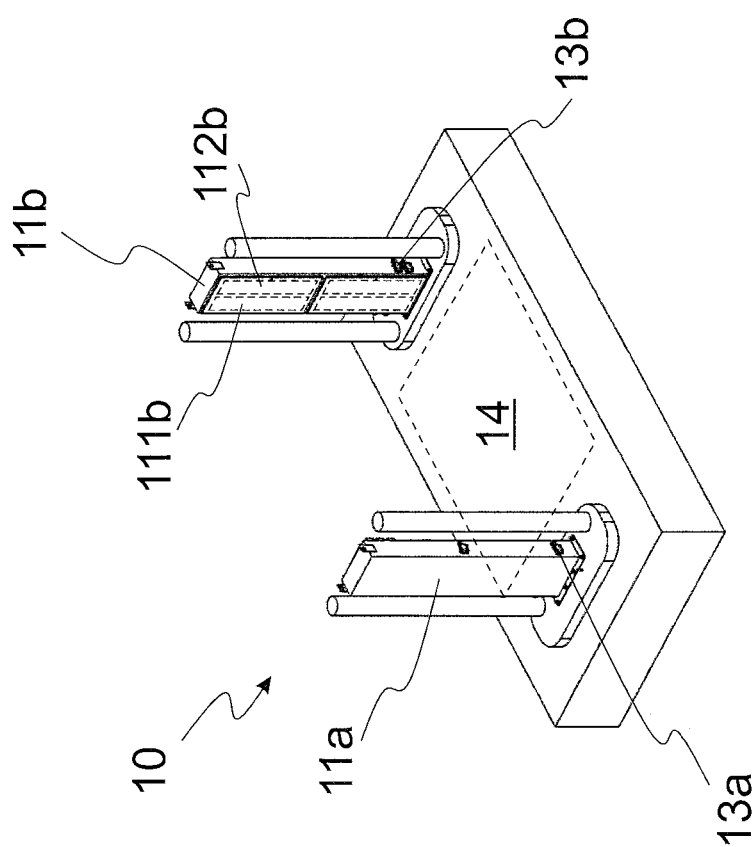
FIG. 1a shows an illustration of an embodiment of an RPM.

FIG. 1a shows an illustration of an embodiment of an RPM 10 of an RPM system. The RPM 10 comprises two oppositely arranged pillars 11a and 11b which define an RPM passage 14 where a moving radiation source passes through in objects to be scanned such as trucks or other traffic. The pillars 11a and 11b contain detectors and instrumentation, such as for example a gamma detector 111b and a neutron detector 112b which are arranged in a housing of the pillar 11b. The RPM 10 comprises ancillary detectors in the form of occupancy sensors 13a and 13b or vehicle identifiers, which are used to detect the presence of an object in the portal passage 14 and if possible, ascertain its nature or identity.

Figure 1B:
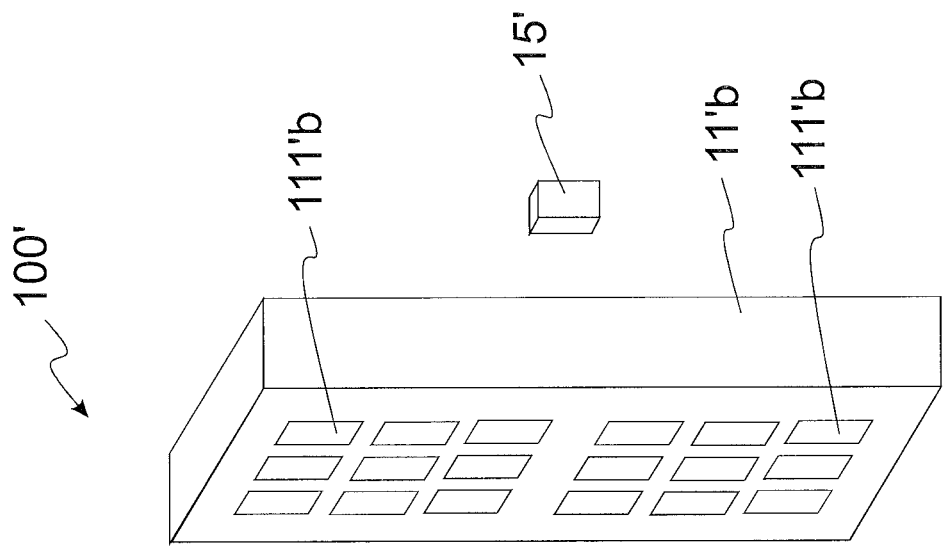
FIG. 1b shows an illustration of an embodiment of an RPM.
Figure 1B:
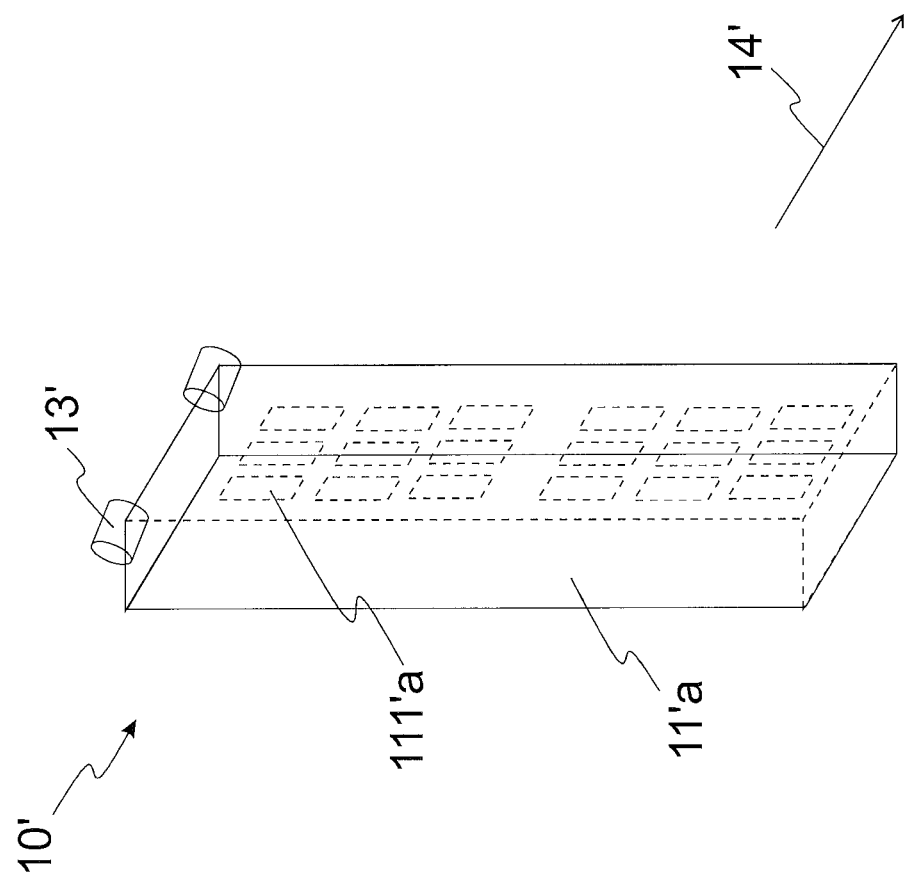

FIG. 1b shows an illustration of a further embodiment of an RPM 10' of an RPM system 100'. The RPM 10' comprises two pillars 11'a and 11'b defining an RPM passage 14'. Each of the pillars 11'a and 11'b comprises arrays of plastic scintillator slabs or tiles 111'a, 111'b, forming a panel radiation detector. The RPM 10' further includes occupancy sensors 13'. Further, the RPM 10' comprises neutron detectors (not shown). The RPM system 100' comprises a control unit 15' with a processor configured to execute a method of identifying a radiation source moving along the passage 14' using an identification machine learning model as described in the present disclosure.

Figure 2:
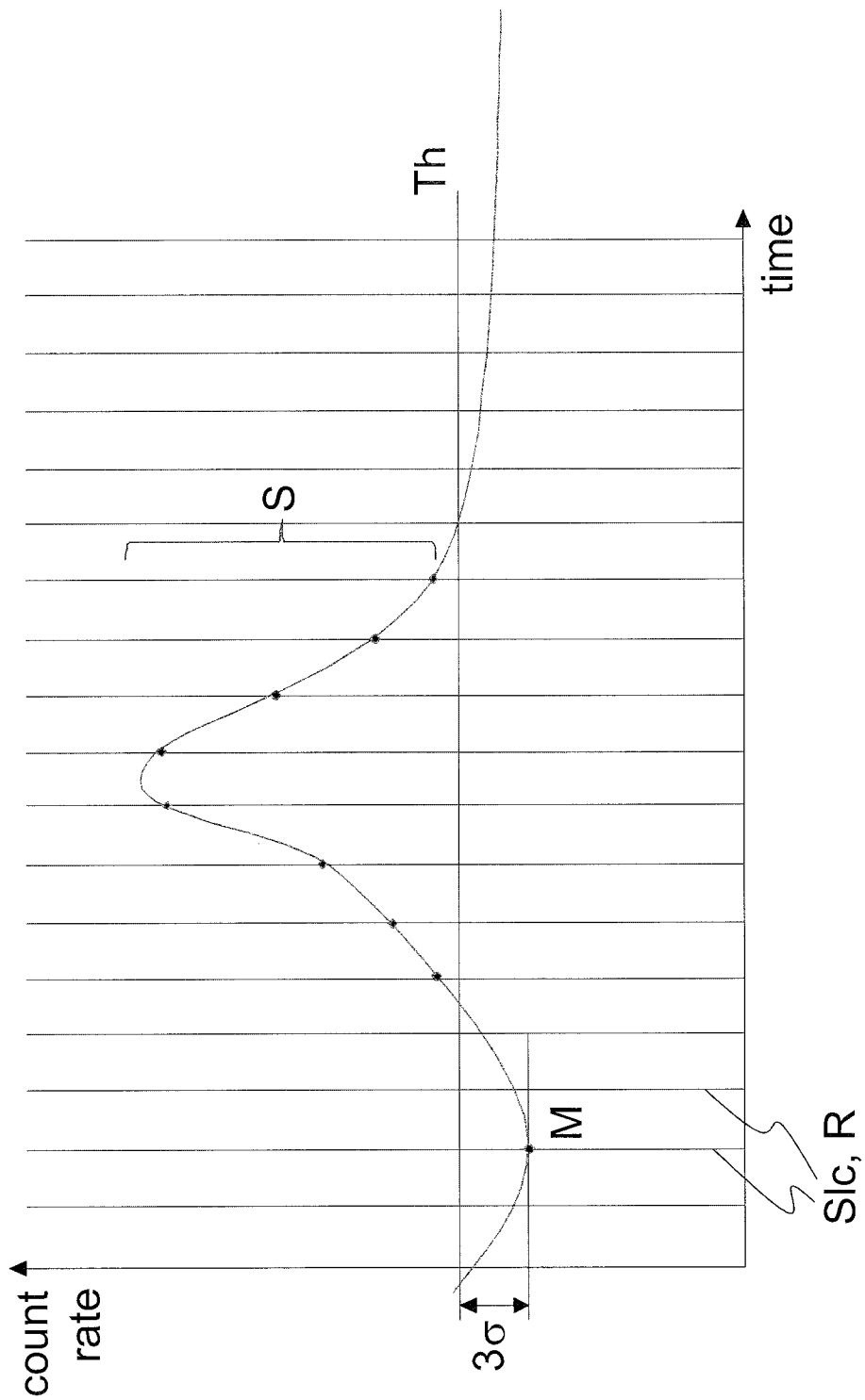
FIG. 2 shows a count rate trace of a detection signal of an RPM where the threshold-based sample selection step is executed.

FIG. 2 shows a count rate trace of a detection signal of a radiation detector of an RPM where the threshold-based sample selection step is executed. The count rate trace is sampled at a sampling rate R in slices Slc. A count rate threshold Th is set as lying 3 times the fluctuations σ of a count rate background above a local minimum M of the count rate trace. By executing the threshold-based sample selection step, response spectrum samples S (as highlighted by points on the count rate trace) of the sampled count rate trace with count rates above the count rate threshold Th are selected. The selected response spectrum samples S are provided as an input to the trained identification machine learning model. In doing so, only response spectrum samples S of slices Slc are selected where the count rate was sufficiently high, which improves the signal-to-noise ratio of the input for the trained identification machine learning model.

Figure 3A:
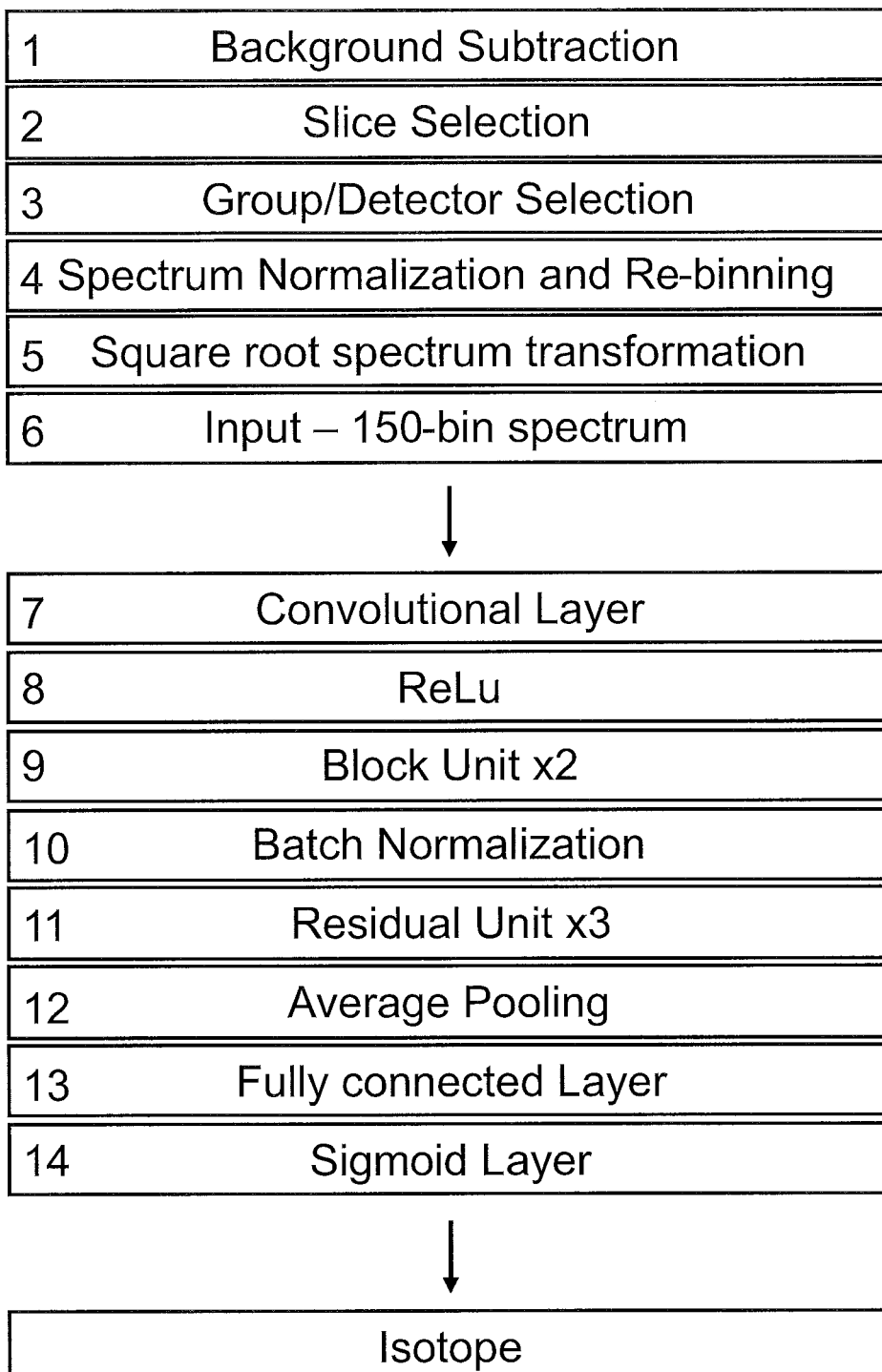
FIG. 3a shows a flow diagram of an exemplary sequence of steps of an embodiment of a method of identifying a moving radiation source an with illustration of the architecture of an embodiment of an identification machine learning model.

FIG. 3a shows a flow diagram of an exemplary sequence of steps of an embodiment of a method of identifying a moving radiation source with an illustration of the architecture of an embodiment of an identification machine learning model based on an artificial neural network (ANN). In step 1, a background is subtracted from the response spectrum of the detection signal of the RPM. The background is recorded for a predetermined time span and subtracted from the response spectrum. The background subtraction step is performed for each radiation detector separately. The background subtraction step can include a compensation step compensating background lowering due to shielding by a truck passing through the RPM. In step 2, a threshold-based sample selection step, as shown for example in FIG. 2, is executed to select only response spectrum samples with sufficiently high count rates. In step 3, a detector selection step is executed where the response spectra of the detection signal of one or more radiation detectors with the largest gamma count rate increase relative to the background count rate is selected to an alarm group and used for the input of the identification machine learning model. Step 2 and step 3 may also be executed in an interchanged order. In step 4, the response spectrum is normalized and re-binned. For example, a spectrum of 1024 bins length as obtained from the radiation detectors may be re-binned to 150 bins, in order to reduce noise, make training faster and reduce overfitting. In step 5, a square root transformation is applied to the response spectrum, in order to increase visibility of small high-energy features with respect to the large low-energy continuum which usually dominates the spectrum. Alternatively, a log transformation may be applied to the response spectrum. By executing the steps 1-5 on the detection signal, an input for the artificial neural network of the identification machine learning model is generated, as indicated by 6.

Figure 3B:
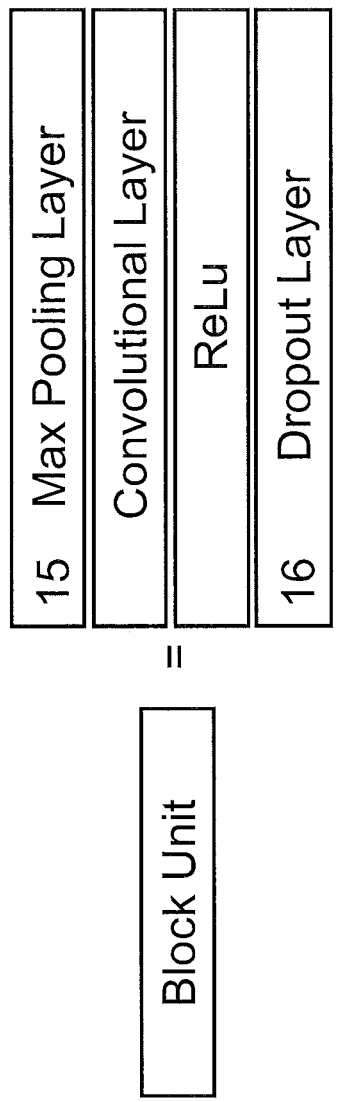

Blocks 7-14 illustrate the architecture of the ANN of the identification machine learning model. Block 7 represents a plurality of convolutional layers, where the initial convolutional layers exhibit a smaller number of filters and larger filter sizes whereas the later convolutional layers exhibit a larger number of filters and smaller filter sizes, such that the initial convolutional layers may be used to detect raw features of the response spectrum and the later convolutional layers may be used to detect more sophisticated features. The block unit 9, which structure is shown in FIG. 3b, repeats multiple times in the ANN, with varying number of filters and kernel size of the convolutional layers. The number of outputs of the fully connected layer 13 corresponds to the number of classifications, for example the number of isotopes or categories to be detected. In the final block 14, sigmoid activation function is used for a multi-label classification situation of mixed radiation sources.

Alternatively, softmax activation function may be used in the final block 14 for a multi-class classification situation for non-mixed radiation sources or categorization tasks.

Figure 4:
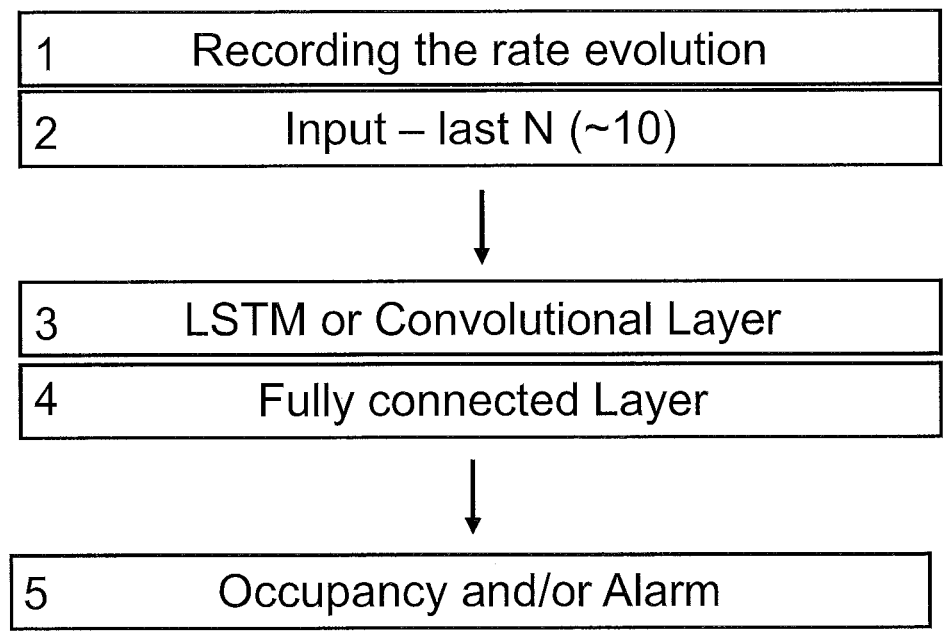
FIG. 4 shows a flow diagram of an exemplary sequence of steps of an alarming or occupancy classification process using an alarming machine learning model or an occupancy machine learning model.

FIG. 4 shows a flow diagram of an exemplary sequence of steps of an alarming or occupancy classification process using an alarming machine learning model or an occupancy machine learning model based on an ANN. As an input to the ANN, the gamma count rate as detected by the one or more gamma detectors of the RPM is used. In the shown example, the gamma rate is recorded twice a second and N=10 slices of the gamma rate are used as an input to the ANN. The ANN uses a Recurrent Neural Network (RNN) architecture with a Long Short Term Memory (LSTM) unit. Alternatively, a convolutional layer may be used. A fully connected layer is used to produce a single number expressing the probability that the gamma count rate evolution is associated to true occupancy or is associated with a threat source so as to trigger an alarm. In some embodiments, a common ANN with a fully connected layer producing two probabilities, one for the occupancy and one for the alarm, may be used.

Figure 5A:
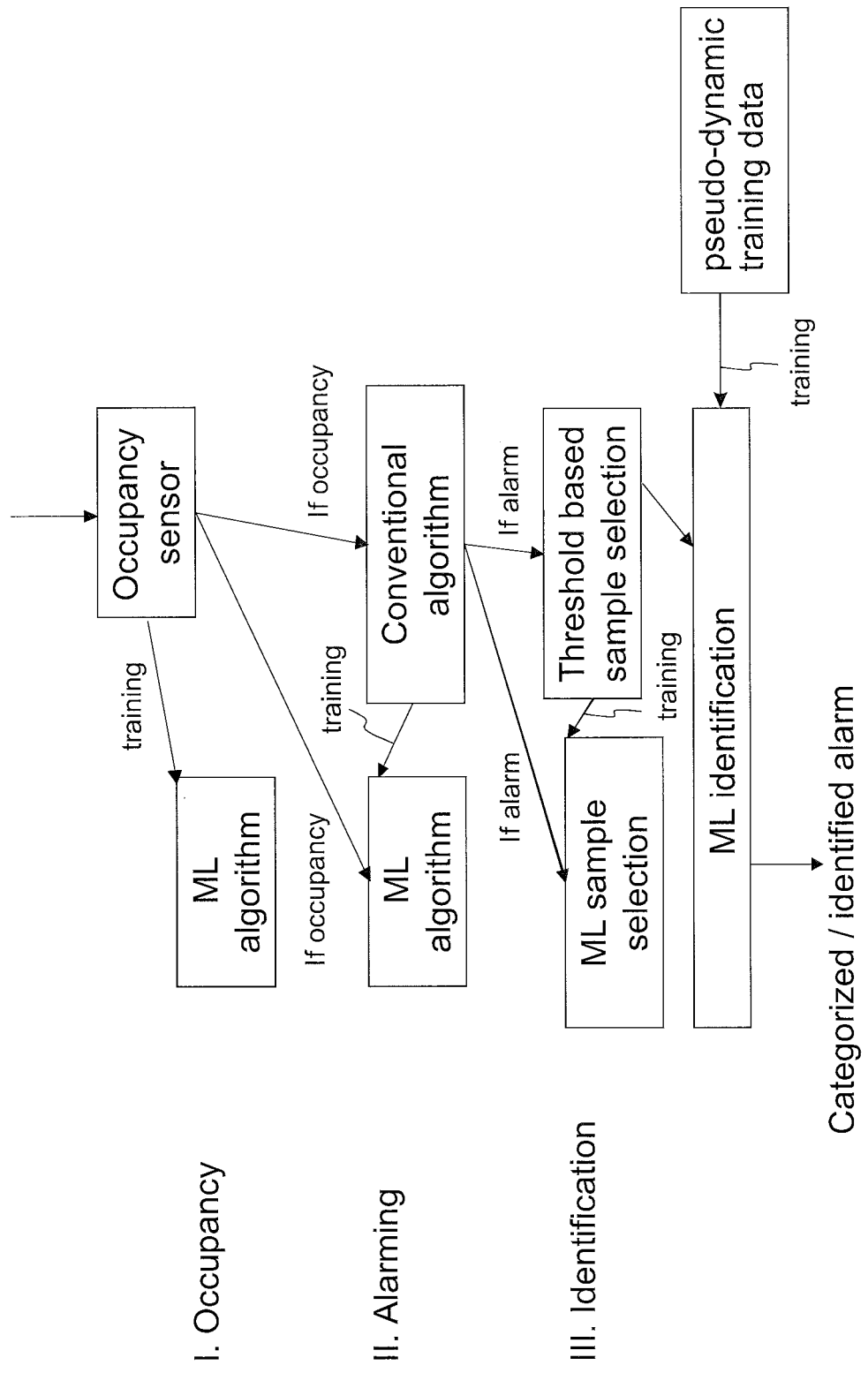
FIG. 5a shows a flow diagram of an exemplary sequence of steps of an embodiment of a method of identifying a moving radiation source at an early stage of training an occupancy machine learning model and of training an alarming machine learning model.

FIG. 5a shows a flow diagram of an exemplary sequence of steps of an embodiment of a method of identifying a moving radiation source at an early stage of training an occupancy machine learning model and of training an alarming machine learning model. The training of the occupancy machine learning model and of the alarming machine learning model are executed by one or more dedicated processors, e.g of a remote computer system. In the shown early stage, occupancy sensing is performed by using a conventional occupancy sensor such as light barriers or a camera. While sensing the occupancy with the conventional occupancy sensor, the at least one processor of the RPM system uses the detection signal of the RPM together with occupancy data generated by the conventional occupancy sensor as occupancy training data for training the machine learning (ML) algorithm of the occupancy ML model. However, the occupancy ML model is not relied on determining occupancy until the occupancy ML model is sufficiently trained to reach or exceed the accuracy of occupancy classification as performed by the conventional occupancy sensor.

The trained occupancy ML model and the alarming ML model are provided by way of an RPM software update to the one or more processors of the RPM classifying the occupancy and/or radiation source as threat or benign. The one or more processors of the RPM may provide the occupancy data generated by the conventional occupancy sensor as occupancy training data to the one or more dedicated processors executing the training of the occupancy ML model.

In case the conventional occupancy sensor detects true occupancy, a conventional alarming algorithm, e.g. using a dynamic threshold on an alarming function of a detection signal of the RPM, is used for alarming decision. At the same time, the RPM detection signal together with the alarming output data of the conventional alarming algorithm is collected for use as alarming training data to train the ML algorithm of the alarming ML model. The one or more processors of the RPM may provide the RPM detection signal together with the alarming output data of the conventional alarming algorithm as alarming training data to the one or more dedicated processors executing the training of the alarming ML model. Similar to occupancy classification, the conventional alarming algorithm is used until the alarming ML model is sufficiently trained to reach or exceed the accuracy of alarming classification as performed by the conventional alarming algorithm.

In case the alarming algorithm triggers an alarm, a threshold-based sample selection is applied to the detection signal. After applying the threshold-based sample selection, the selected response spectrum samples are used as input to the identification ML model. The identification ML model in turn is trained by using pseudo-dynamic training data, as described in the present disclosure. The training of the identification ML model is executed by one or more dedicated processors. Additionally and optionally, a sample selection ML model is provided, which is trained by RPM detection signal data together with output data of the threshold-based sample selection used as sample selection training data. The training of the sample selection ML model is executed by one or more dedicated processors. In particular, training of the occupancy ML model, the alarming ML model, the identification ML model and the sample selection ML model is preferably executed by the same one or more dedicated processors.

FIG. 5b shows a flow diagram of an exemplary sequence of steps of an embodiment of a method of identifying a moving radiation source using a trained occupancy machine learning model and at an early stage of training an alarming machine learning model. In the shown situation, the occupancy ML model has sufficiently been trained compared to the situation shown in FIG. 5a such that the occupancy ML model is solely used to classify occupancy as true or false from RPM detection signal. Compared to the situation in FIG. 5a, the alarming ML model has also been trained in a fashion that the accuracies of alarming classification as performed by the alarming ML model and the conventional alarming algorithm are comparable. Therefore, the alarming ML model and the conventional alarming algorithm are used in parallel by using an "OR" logic. The output data of the conventional alarming algorithm, however, is continued to be used together with the RPM detection signal to collect data to train the alarming ML model. The threshold-based sample selection algorithm is applied to the RPM detection signal, in case the alarming ML model or the conventional alarming algorithm triggers an alarm. In case the alarming ML model or the conventional alarming algorithm triggers an alarm, the RPM detection signal together with the output of the threshold-based sample selection algorithm is collected for use as training data to train the sample selection ML model. However, the output of the sample selection ML model is not used as input for the identification ML model, as the threshold-based sample selection algorithm is still superior in selecting response spectra with sufficiently high count rate or signal strength, respectively, and in discarding insignificant RPM detection signal data.

Figure 5C:
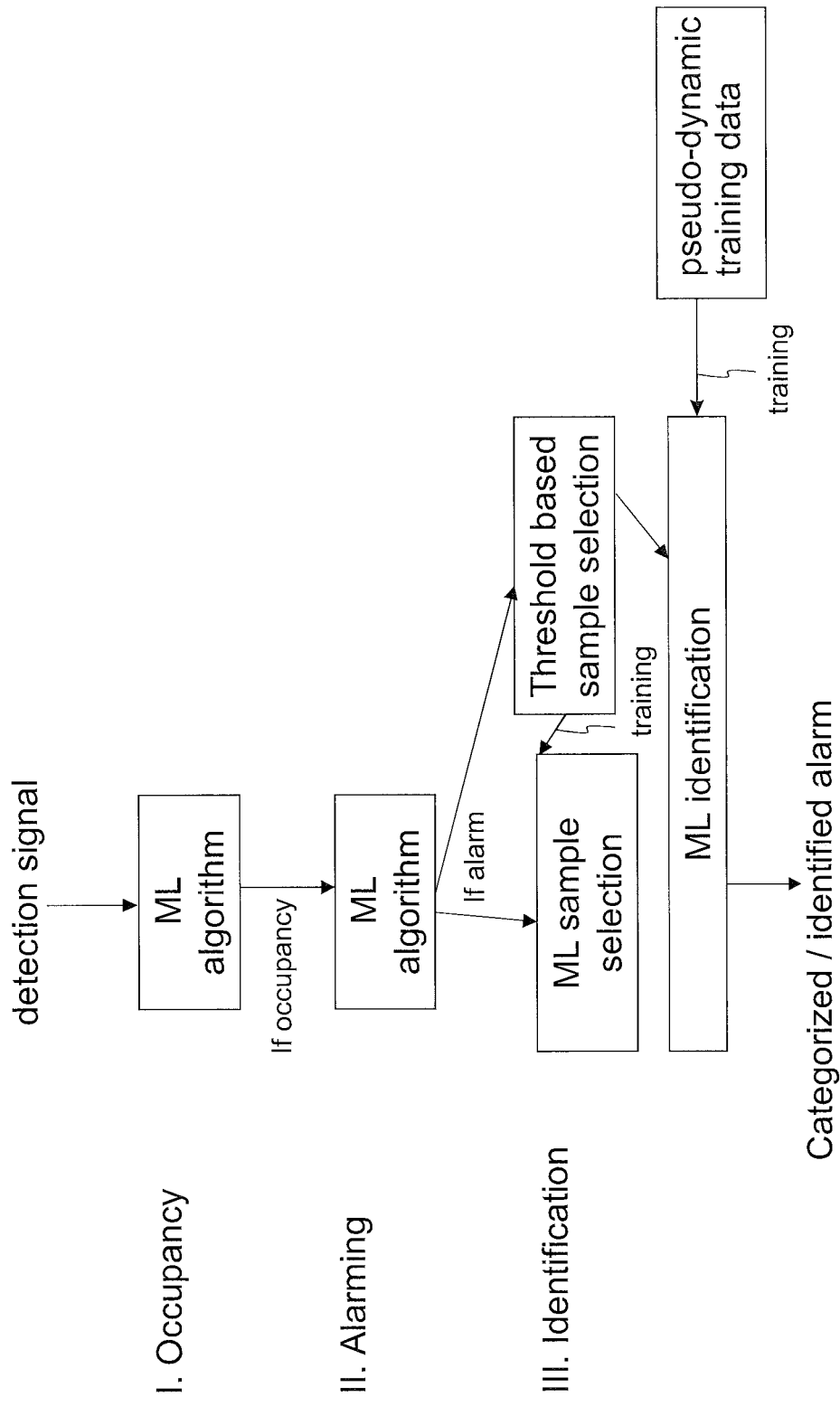
FIG. 5c shows a flow diagram of an exemplary sequence of steps of an embodiment of a method of identifying a moving radiation source using a trained occupancy machine learning model and a trained alarming machine learning model with training of a sample selection machine learning model.

FIG. 5c shows a flow diagram of an exemplary sequence of steps of an embodiment of a method of identifying a moving radiation source using a trained occupancy machine learning model and a trained alarming machine learning model with training of a sample selection machine learning model. In the shown situation, both the occupancy ML model and the alarming ML model have reached accuracies in classification which exceed the ones of the conventional occupancy sensor and of the conventional alarming algorithm. Therefore, only the occupancy ML model and the alarming ML model are used for occupancy classification and alarming classification. In some embodiments, the occupancy classification and alarming classification are executed by a common ML model.

Figure 5D:
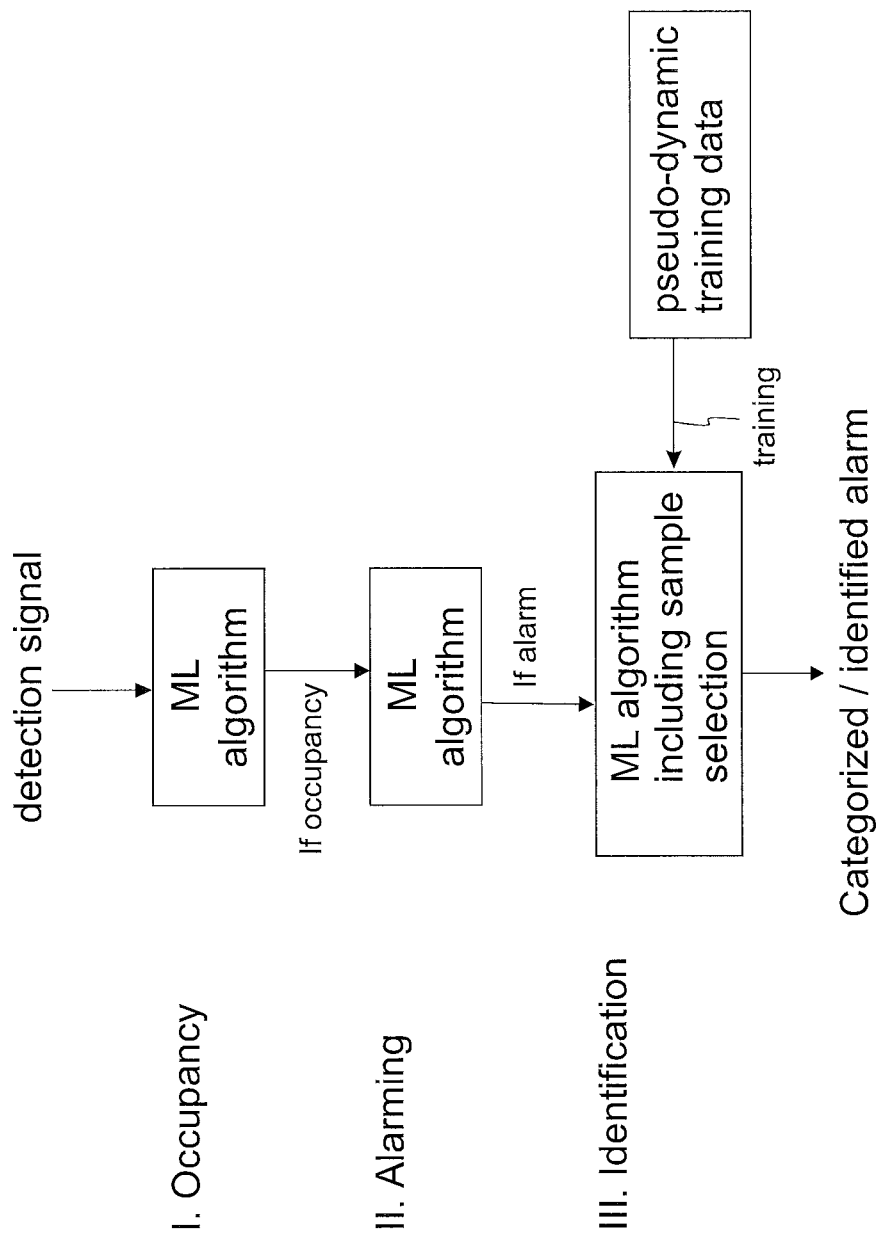
FIG. 5d shows a flow diagram of an exemplary sequence of steps of an embodiment of a method of identifying a moving radiation source using a trained occupancy machine learning model, a trained alarming machine learning model and an identification machine learning model.

FIG. 5d shows a flow diagram of an exemplary sequence of steps of an embodiment of a method of identifying a moving radiation source using a trained occupancy machine learning model, a trained alarming machine learning model and an identification machine learning model. In the shown situation, the sample selection ML model has sufficiently been trained such that the sample selection ML model is carrying out the sample selection task and the threshold-based sample selection algorithm can be omitted. In the shown example, a single identification ML model is applied which includes also sample selection. The identification ML model has been trained using pseudo-dynamic training data and is used to perform identification comprising category classification and/or isotope classification of a moving radiation source passing through the RPM. In some embodiments, the threshold-based sample selection algorithm is permanently used and the sample selection ML model is omitted. In this case, only identification is executed by the identification ML model.

FIG. 6 shows an illustration of an embodiment of an RPM system 100" comprising an RPM 10" with pillars 11"*a*, 11"*b* and a control system 15" with a processor 16". The control system 15" may be a remote computer system, especially a cloud-based computer system which communicates with the RPM 10" via a communication network 18", which may be the internet. The processor 16" provides the identification ML model and executes the identification classification using the trained identification ML model. Further, the processor 16" trains the identification ML model using pseudo-dynamic identification training data obtained from static identification training data stored in a database 17". The processor 16" conditions the static identification training data by introducing modifications representing alterations to the detection signal due to the movement of the radiation source. In some embodiments, the processor 16" executes providing of the identification ML model, the generating of the pseudo-dynamic identification training data and the training of the identification ML model, whereas a processor 16"*a* of a control unit at the RPM 10" executes the identification classification using the trained identification ML model.

The invention claimed is:

1. A method for identifying a moving radiation source by a radiation portal monitoring system, the radiation portal monitoring system comprising a radiation portal monitor comprising a plurality of radiation detectors configured to detect ionizing radiation of the moving radiation source and to generate a detection signal responsive to detection of the ionizing radiation, and at least one processor, the method comprising the at least one processor executing the steps of:
   providing an identification machine learning model;
   receiving labelled static identification training data generated by radiation detection of a plurality of known static radiation sources;
   introducing to the static identification training data modifications representing detection signal alterations caused by radiation source movement through the radiation portal monitor to obtain pseudo-dynamic identification training data;
   training the identification machine learning model using the pseudo-dynamic identification training data; and
   identifying the moving radiation source from the detection signal using the trained identification machine learning model.

2. The method according to claim 1, wherein identifying the moving radiation source from the detection signal using the trained identification machine learning model further comprises a threshold-based sample selection step, the threshold-based sample selection step comprising the at least one processor executing the steps of:
   sampling a count rate trace of the detection signal of a radiation detector of the radiation portal monitoring system at a sampling rate R;
   selecting response spectrum samples of the sampled count rate trace with count rates above a count rate threshold; and
   providing the selected response spectrum samples as an input to the trained identification machine learning model.

3. The method according to claim 2, wherein the at least one processor sets the count rate threshold as lying n times the fluctuations $\sigma$ of a count rate background above a local minimum of the count rate trace.

4. The method according to claim 2, wherein the threshold-based sample selection step further comprises the at least one processor executing an energy selection step by selecting samples within one or more predetermined energy windows of interest.

5. The method according to claim 1, wherein identifying the moving radiation source from the detection signal using the trained identification machine learning model further comprises the at least one processor executing a detector selection step by selecting a detection signal of one or more radiation detectors of the radiation portal monitoring system with a largest count rate increase relative to a background count rate as an input to the trained identification machine learning model.

6. The method according to claim 5, wherein, when the at least one processor selects detection signals of a group of radiation detectors in the detector selection step, the detection signals of at least a portion of the group of radiation detectors are shifted in time by the at least one processor.

7. The method according to claim 1, wherein the identification machine learning model comprises an artificial neural network.

8. The method according to one claim 1, wherein the method further comprises the at least one processor executing the steps of:
   providing an alarming machine learning model;
   receiving alarming training data labelled as potential threat source worthy of further analysis or as benign source not worthy of further analysis;
   training the alarming machine learning model using the alarming training data;
   classifying the moving radiation source from the detection signal using the trained alarming machine learning model as potential threat source or benign source; and
   in case of the moving radiation source being classified as potential threat source, identifying the moving radiation source from the detection signal using the trained identification machine learning model.

9. The method according to claim 8, wherein the alarming training data is generated by one or more of: count rate evolution data, count rate evolution data within one or more predetermined energy windows of interest, or spectral evolution data of the radiation portal monitor, labelled using secondary inspection data.

10. The method according to claim 8, wherein the alarming training data is generated by one or more of: count rate evolution data, count rate evolution data within one or more predetermined energy windows of interest, or spectral evolution data of the radiation portal monitor, conditioned by introducing modifications representing predetermined anomalies of response spectra of the detection signal caused by the presence of threat sources with varying shielding configurations.

11. The method according to claim 8, wherein the alarming training data is generated by one or more of count rate evolution data, count rate evolution data within one or more predetermined energy windows of interest, spectral evolution data, of another radiation portal monitor, labelled using secondary inspection data, wherein the count rate or spectral evolution data is conditioned by introducing modifications representing differences in detector configuration with respect to the other radiation portal monitor.

12. The method according to claim 8, wherein the method further comprises the at least one processor executing a conventional alarming algorithm using a dynamic threshold on an alarming function of one or more of: count rate evolution data, count rate evolution data within one or more predetermined energy windows of interest, or spectral evolution data of the radiation portal monitor, wherein the at least one processor classifies the moving radiation source as potential threat source if the alarming function exceeds the dynamic threshold.

13. The method according to claim 12, wherein prior to and/or while training the alarming machine learning model, the method further comprises the at least one processor classifying the moving radiation source from the detection signal as potential threat source or benign source using the conventional alarming algorithm.

14. The method according to claim 12, wherein the at least one processor uses the detection signal of the radiation portal monitor together with output data of the conventional alarming algorithm as alarming training data to train the alarming machine learning model.

15. The method according to claim 12, wherein while training the alarming machine learning model, the method further comprises the at least one processor determining and comparing the accuracies of the classification of the moving radiation source from the detection signal as potential threat source or benign source using the conventional alarming algorithm and using the alarming machine learning model, and terminating the using of the conventional alarming algorithm if the accuracy of the classification using the alarming machine learning model exceeds the accuracy of the classification using the conventional alarming algorithm.

16. The method according to claim 8, wherein the method further comprises the at least one processor training the alarm machine learning model for occupancy classification using one or more of count rate evolution data, count rate evolution data within one or more predetermined energy windows of interest, or spectral evolution data of the radiation portal monitor or another radiation portal monitor, labelled by true or false occupancy, as occupancy training data for the alarm machine learning model.

17. The method according to claim 1, wherein the method further comprises the at least one processor executing the steps of:
providing an occupancy machine learning model;
receiving occupancy training data labelled by true occupancy or false occupancy;
training the occupancy machine learning model using the occupancy training data; and
classifying a detection signal as being associated with true occupancy or with false occupancy using the trained occupancy machine learning model;
in case of a detection signal being classified as being associated with true occupancy, identifying a moving radiation source from the detection signal using the trained identification machine learning model.

18. The method according to claim 17, wherein the occupancy training data is generated by one or more of: count rate evolution data, count rate evolution data within one or more predetermined energy windows of interest, or spectral evolution data of the radiation portal monitor or another radiation portal monitor.

19. The method according to claim 17, wherein the at least one processor uses the detection signal of the radiation portal monitor together with occupancy data of conventional occupancy sensors and/or occupancy data from time delayed detection signals of an array of radiation detectors arranged along a direction of passage through the radiation portal monitor as occupancy training data.

20. The method according to claim 17, wherein the at least one processor uses occupancy sensing data from another radiation portal monitor, conditioned by introducing modifications representing differences in detector configuration with respect to the other radiation portal monitor, as occupancy training data.

21. The method according to claim 1, wherein the identification machine learning model is validated using a validation dataset of detection signals labelled by using secondary inspection data.

22. The method according to claim 1, wherein the labelled static identification training data is generated by a plurality of measurements per known static radiation source at several distances between the known static radiation source and radiation detectors, wherein the radiation detectors are part or not part of the radiation portal monitor.

23. The method according to claim 1, wherein the modifications introduced to the labelled static identification training data represent detection signal alterations caused by one or more of: alteration of response spectrum of the detection signal due to different relative positions of the radiation detectors, broadening of peak structures in response spectrum of the detection signal due to shielding of the radiation source by a container containing the radiation source, alteration of the response spectrum due to variation of angle of incidence of the ionizing radiation, changes in the detection signal background due to traffic passing through the radiation portal monitor and at least partially shielding background radiation, shifting of spectra of the radiation source to higher or lower energies due to imperfect radiation detector calibration, response spectrum alteration due to varying speed of the radiation source movement, response spectrum alteration due to detector under-performance, and/or response spectrum alteration due to statistical nature of the radiation detection.

24. A radiation portal monitoring system for detecting and identifying a moving radiation source, comprising a radiation portal monitor comprising a plurality of radiation detectors configured to detect ionizing radiation of the moving radiation source and to generate a detection signal responsive to detection of the ionizing radiation, and at least one processor configured to:
provide an identification machine learning model;
receive labelled static identification training data generated by a plurality of measurements of static radiation sources;
condition the static identification training data by introducing modifications representing detection signal alterations caused by radiation source movement through the radiation portal monitor to obtain pseudo-dynamic identification training data;
train the identification machine learning model using the pseudo-dynamic identification training data; and
identify the moving radiation source from the detection signal using the trained identification machine learning model.

25. The radiation portal monitoring system according to claim 24, wherein the at least one processor is further configured to:
sample a count rate trace of the detection signal of a radiation detector of the radiation portal monitoring system at a sampling rate R;
select response spectrum samples of the sampled count rate trace with count rates above a count rate threshold; and
provide the selected response spectrum samples as an input to the trained identification machine learning model.

26. The radiation portal monitoring system according to claim 24, wherein the radiation portal monitor comprises one or more panel radiation detectors comprising a plurality of adjoining plastic scintillator slabs, a plurality of silicon photomultiplier sensors arranged at an edge of at least one of the plastic scintillator slabs and configured to detect scintillation light generated in the scintillator slabs responsive to the radiation events, a plurality of signal processing units each connected to one of the silicon photomultiplier sensors, and a joint analyzing circuit configured to perform signal analysis to determine the energy of the detected radiation events.

27. A non-transitory computer-readable medium comprising computer program code for identifying a radiation source moving through a radiation portal monitor of a radiation portal monitoring system, the radiation portal monitor comprising a plurality of radiation detectors configured to detect ionizing radiation of the radiation source and to generate a detection signal responsive to detection of the ionizing radiation, the computer program code configured to control at least one processor of the radiation portal monitoring system such that the at least one processor executes the steps of:
  providing an identification machine learning model;
  receiving labelled static identification training data generated by a plurality of measurements of static radiation sources;
  conditioning the static identification training data by introducing modifications representing detection signal alterations caused by radiation source movement through the radiation portal monitor to obtain pseudo-dynamic identification training data;
  training the identification machine learning model using the pseudo-dynamic identification training data; and
  identifying the moving radiation source from the detection signal using the trained identification machine learning model.

28. A method for identifying a moving radiation source by a radiation portal monitoring system, the radiation portal monitoring system comprising a radiation portal monitor comprising a plurality of radiation detectors configured to detect ionizing radiation of the moving radiation source and to generate a detection signal responsive to detection of the ionizing radiation, and at least one processor, the method comprising the at least one processor executing the steps of:
  providing an identification machine learning model; and
  identifying the moving radiation source from the detection signal using the identification machine learning model, wherein
  the identification machine learning model is trained using pseudo-dynamic identification training data, wherein
  the pseudo-dynamic identification training data is obtained by introducing to labelled static identification training data modifications representing detection signal alterations caused by radiation source movement through the radiation portal monitor, and wherein
  the labelled static identification training data is generated by radiation detection of a plurality of known static radiation sources.

29. A non-transitory computer-readable medium comprising computer program code configured to control at least one processor such that the at least one processor executes the steps of the method according to claim 28.

30. A method for generating pseudo-dynamic identification training data for an identification machine learning model configured to identify a moving radiation source from a detection signal of a radiation portal monitoring system, the radiation portal monitoring system comprising a radiation portal monitor comprising a plurality of radiation detectors configured to detect ionizing radiation of the moving radiation source and to generate a detection signal responsive to detection of the ionizing radiation, the method comprising the steps of:
  generating static identification training data from radiation detection of a plurality of known static radiation sources; and
  generating pseudo-dynamic identification training data by introducing to the static identification training data modifications representing detection signal alterations caused by radiation source movement through the radiation portal monitor.

31. The method according to claim 30, wherein radiation detection of a plurality of known static radiation sources comprises one or more radiation detectors executing a plurality of measurements per isotope at several distances between the isotopes and the one or more radiation detectors.

32. The method according to claim 30, wherein static identification training data is further generated by simulation of spectra of known isotopes or by accessing a database with spectra of known isotopes.

33. A computer-implemented method of training an identification machine learning model to obtain a trained identification machine learning model configured to identify a moving radiation source from a detection signal of a radiation portal monitoring system, the radiation portal monitoring system comprising a radiation portal monitor with a plurality of radiation detectors configured to detect ionizing radiation of the moving radiation source and to generate a detection signal responsive to detection of the ionizing radiation, the method comprising at least one processor executing the steps of:
  providing the identification machine learning model;
    receiving labelled static identification training data generated by radiation detection of a plurality of known static radiation sources;
    introducing to the static identification training data modifications representing detection signal alterations caused by radiation source movement through the radiation portal monitor to obtain pseudo-dynamic identification training data;
  training the identification machine learning model using the pseudo-dynamic identification training data; and
  storing the trained identification machine learning model.

* * * * *